United States Patent
Tsunekawa et al.

(10) Patent No.: US 8,528,538 B2
(45) Date of Patent: Sep. 10, 2013

(54) WARM AIR FURNACE

(75) Inventors: Ikuo Tsunekawa, Nagoya (JP); Keiichi Ito, Nagoya (JP)

(73) Assignee: Rinnai Corporation, Nagoya-Shi (JP)

( * ) Notice: Subject to any disclaimer, the term of this patent is extended or adjusted under 35 U.S.C. 154(b) by 492 days.

(21) Appl. No.: 12/792,086

(22) Filed: Jun. 2, 2010

(65) Prior Publication Data
US 2011/0297139 A1    Dec. 8, 2011

(51) Int. Cl.
*F24H 3/06*    (2006.01)

(52) U.S. Cl.
USPC .................. 126/99 R; 126/113; 72/370.1

(58) Field of Classification Search
USPC ................ 126/113, 99 R; 72/370.1, 370.12, 72/370.13
See application file for complete search history.

(56) References Cited

U.S. PATENT DOCUMENTS

| | | | | |
|---|---|---|---|---|
| 1,347,216 A | * | 7/1920 | Etzel | 137/201 |
| 2,383,377 A | * | 8/1945 | Evans et al. | 202/190 |
| 2,414,189 A | * | 1/1947 | Christiansen | 236/63 |
| 3,373,578 A | * | 3/1968 | Feeney et al. | 62/189 |
| 4,424,989 A | * | 1/1984 | Spencer et al. | 285/14 |
| 6,539,977 B1 | * | 4/2003 | Hutchinson et al. | 138/44 |
| 6,708,727 B2 | * | 3/2004 | Shiraishi et al. | 138/39 |
| 2004/0250785 A1 | * | 12/2004 | Oba et al. | 123/184.57 |
| 2010/0025485 A1 | * | 2/2010 | Kaneiwa | 237/53 |
| 2010/0025487 A1 | * | 2/2010 | Kaneiwa | 237/2 A |

FOREIGN PATENT DOCUMENTS

| | | |
|---|---|---|
| JP | S54-169937 | 5/1978 |
| JP | S53-145752 | 11/1978 |
| JP | S57-10658 | 1/1982 |
| JP | 11-230050 | 8/1999 |
| KR | 2003004577 A * | 1/2003 |

* cited by examiner

*Primary Examiner* — Kenneth Rinehart
*Assistant Examiner* — Jorge Pereiro
(74) *Attorney, Agent, or Firm* — Rankin, Hill & Clark LLP

(57) ABSTRACT

A drain pipe 54 includes an upper end portion 54a which is connected to a concave 38a of a leading end 38 of an exhaust tube 34, and a lower end portion 54b which is opened to the inside of a warm air furnace below the concave 38a. The lower end portion 54b is formed as a tubular portion where a membrane is formed at a plane orthogonal to an axis line 54d by a surface tension of a drain. A leading end 54e of the tubular portion is formed as an opening 54f with an area large enough such that the membrane is not generated by the surface tension of the drain.

2 Claims, 5 Drawing Sheets

WARM AIR FURNACE

BACKGROUND OF THE INVENTION

1. Field of the Invention

The present invention relates to a warm air furnace having means for discharging drain which is a condensation of water vapor in combustion gas.

2. Description of the Related Art

Conventionally, as a drain discharging means in a warm air furnace, there is known a configuration formed so as to reduce the combustion gas combusted at the combusting means from leaking into a room. The first example has a drain pipe provided at a midstream of an exhaust passage with a sealed lower end, and a small-diameter hole formed at an upper side surface of the drain pipe (refer to Japanese utility model laid-open No. S57-010658). The second example has an orifice provided inside the drain pipe (refer to Japanese utility model laid-open No. S54-169937). The third example makes the inner diameter of a drain discharging pipe to be small diameter such that an exhaust gas does not leak because a surface tension of the drain (refer to Japanese utility model laid-open No. S53-145752).

In the drain discharging means of the warm air furnace as is mentioned above, in the first example, drain is accumulated in the drain pipe from the lower end of the drain pipe to the height of the hole at the side surface of the drain pipe. Further, in the second and third examples, because of the orifice provided in the drain pipe or because a membrane is generated at the lower end of the drain discharging pipe from the surface tension of the drain, drain is accumulated in the drain pipe or the drain discharging pipe until a head of water overcoming the surface tension of the drain is generated.

That is, there is a problem that drain is accumulated in the drain pipe of each of the conventional technique mentioned above, so that corrosion may occur at the drain pipe or the drain discharging pipe.

SUMMARY OF THE INVENTION

In view of such circumstances, an object of the present invention is to provide a warm air furnace capable of reducing leaking of combusted gas combusted at a combustor into a room, and to prevent drain from accumulating in a drain pipe.

In order to achieve the above object, the present invention provides a warm air furnace comprising: an air intaker which takes in outdoor air; a combustor which is supplied with air taken in by the air intaker together with combustion gas so as to combust the same; an exhauster which exhausts combustion gas combusted at the combustor outdoors; a thermal exchanger which is provided at the exhauster and which transmits heat of the combusting gas to indoor air; an air blower which blows indoor air so as to have heat transmitted from the thermal exchanger; and a drain discharger which discharges drain formed from condensation of water vapor inside the combustion gas at the discharger; wherein the drain discharger is configured in a pipe-like shape with one end connected to the discharger and the other end opened into the warm air furnace below the discharger, the other end of the drain discharger is formed into a tubular portion with a membrane generated at a plane orthogonal to an axis line by a surface tension of the drain, and the leading end of the tubular portion is formed as an opening having an area large enough such that the membrane is not generated by the surface tension of the drain.

According to the present invention, the other end of the pipe constituting the drain discharger is formed as the tubular portion with membrane generated at the plane orthogonal to the axis line by the surface tension of the drain. The cross-section of such tubular portion is small enough to suppress leaking of the combustion gas combusted at the combustor into the room, so that it is possible to reduce leaking of the combustion gas into the room.

On the other hand, the leading end of the tubular portion is formed as the opening having the area large enough such that the membrane is not generated by the surface tension of the drain. Therefore, the drain flowing into the tubular portion is discharged from the leading end of the tubular portion, without generating the membrane at the leading end of the tubular portion from the surface tension. By doing so, it becomes possible to prevent drain from accumulating in the drain pipe.

In the present invention, the leading end of the tubular portion is formed in an inclined manner, so that membrane is not generated from the surface tension of the drain.

Further, it is preferable that the tubular portion is formed by caulking a side surface of the other end. By doing so, it becomes possible to easily form the other end of the drain discharger as the tubular portion with the membrane generated at a plane orthogonal to the axis line by the surface tension of the drain.

DETAILED DESCRIPTION OF THE PREFERRED EMBODIMENTS

Figure 1:
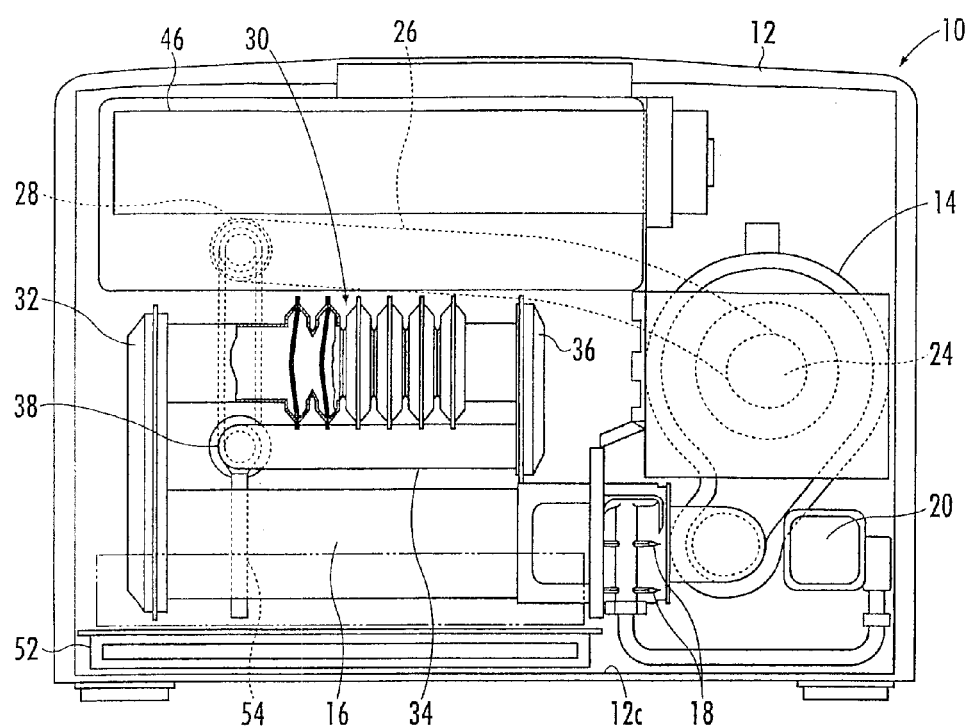
FIG. 1 is a front view of an example of a warm air furnace according to the present invention.

In a warm air furnace 10 shown in FIG. 1, a combustion blower 14 is attached to the right side of a flat, horizontally-long casing 12 made of sheet-metal, and a horizontal tubular combustion tube 16 is installed to the lower portion thereof. A gas burner 18 as a combustor is provided to the right end of the combustion tube 16, and is supplied with combustion air from an air outlet of the combustion blower 14 and is provided with fuel gas from a fuel gas supply mechanism 20, so as to carry out combustion.

Figure 2:
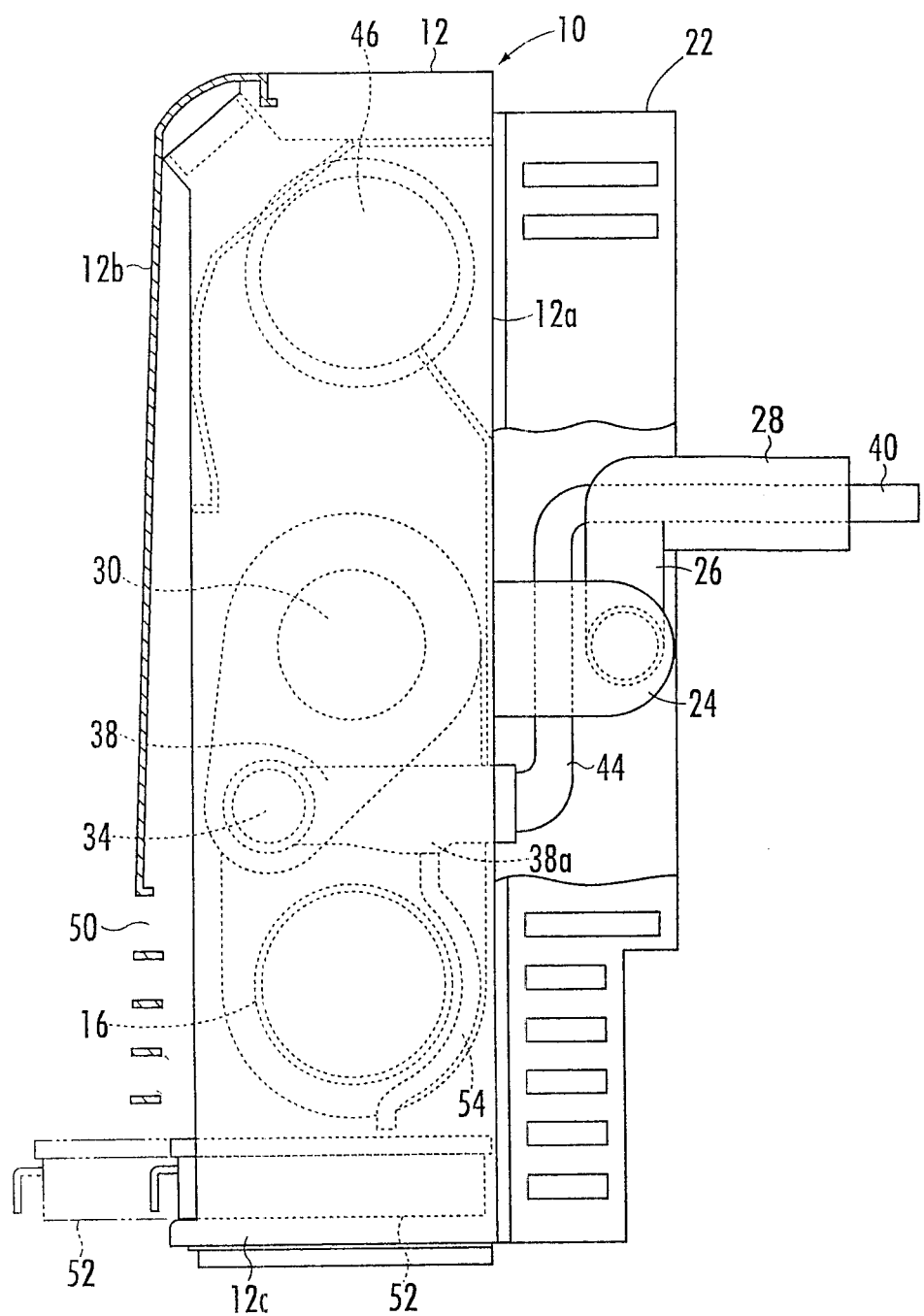
FIG. 2 is a side view of an example of the warm air furnace according to the present invention.
Figure 3:
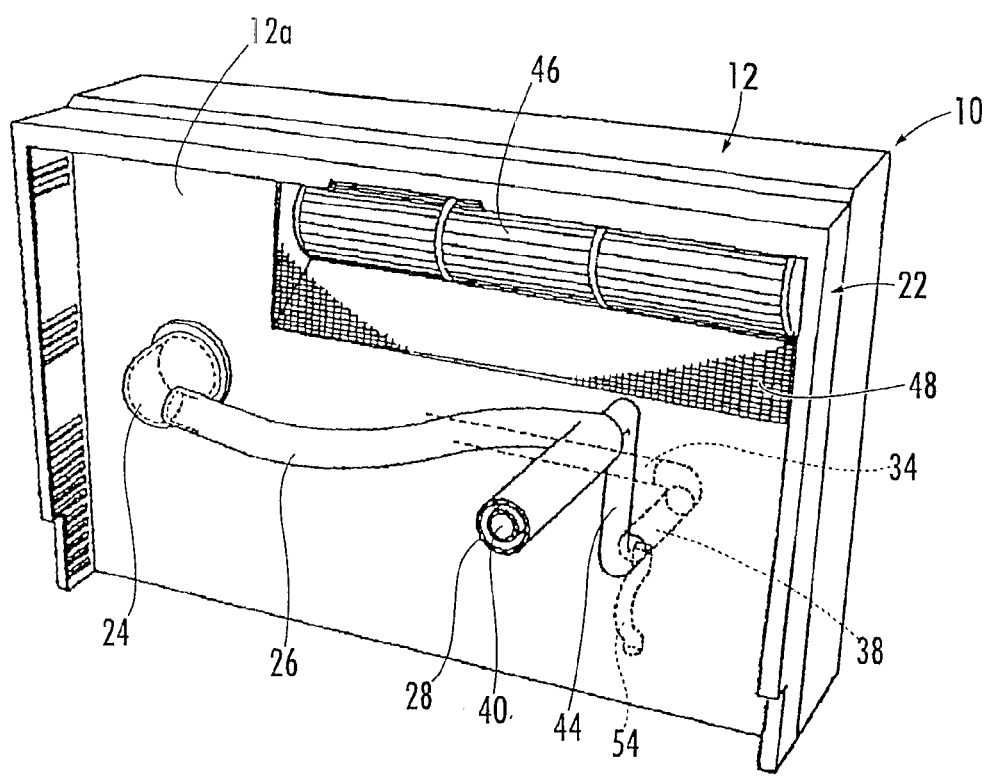
FIG. 3 is a rear perspective view of an example of the warm air furnace according to the present invention.

As shown in FIG. 2 and FIG. 3, the rear surface of the casing 12 is connected with an outdoor air intake pipe 28 for introducing outdoor air to the combustion blower 14, an air duct 26, an exhaust outer pipe 40 for discharging combustion gas combusted in the gas burner 18 outdoors, and a frame 22 for securing handling space of an exhaust duct 44. An air inlet 24 of the combustion blower 14 is an inlet tube with the leading end closed, which penetrates through the rear surface of the casing 12 so as to protrude rearward. The side surface of the air inlet 24 is connected with the air duct 26, and the air duct 26 is connected to the outdoor air intake pipe 28 which is inserted into a hole (not shown) formed to a wall of a room so as to connect outdoor and indoor inside of the frame 22.

In the present embodiment, the combustion blower 14, the outdoor air intake pipe 28, the air duct 26, the air inlet 24 and the combustion blower 14 constitutes an air intaker.

A heat exchanger 30, which is a thermal exchanger for conducting heat of the combustion gas to indoor air, is installed horizontally on the upper side of the combustion tube 16 inside the casing 12. The left end of the combustion tube 16 and the left end of the heat exchanger 30 are connected by a connecting tube 32 with a rectangular cross-section. An exhaust tube 34 is attached between the heat exchanger 30 and the combustion tube 16 in parallel thereto. The right end of the heat exchanger 30 and the right end of the exhaust tube 34 are connected by a connecting tube 36 with a rectangular cross-section.

A leading end 38 of the exhaust tube 34 is bent 90° towards the rear surface side. The exhaust tube 34 penetrates through a backboard 12a, extends rearward and becomes an exhaust outlet of the gas burner 18. Further, the leading end 38 is connected to the exhaust outer pipe 40 which is installed inside the outdoor air intake pipe 28 coaxially thereto via the exhaust duct 44, inside the frame 22.

In the present embodiment, the connecting tube 32, the connecting tube 36, the exhaust outer pipe 40 and the exhaust duct 44 constitutes the exhauster.

An elongated cylindrical warm air blow fan 46, which is a blower, is installed horizontally at the upper portion of the casing 12. The warm air blow fan 46 blows out the indoor air taken in from an indoor air inlet 48 (refer to FIG. 3) formed at the upper portion of the back board 12a of the casing 12 frontward from a warm air outlet 50 (refer to FIG. 2) formed at the lower portion of a front board 12b of the casing 12. The indoor air flows around the heat exchanger 30, the exhaust tube 34, and the combustion tube 16, is heated to a high temperature from heat exchanging therewith, and is blown out frontward from the warm air outlet 50.

A humidifying water dish 52 is installed on a casing bottom board 12c below the combustion tube 16 inside the casing 12, so as to be pulled out from the front side thereof.

A concave 38a expanding downward (refer to FIG. 2) is formed to the lower surface of the leading end 38 of the exhaust tube 34, so as to form an accumulating region of the drain. An upper end of a drain pipe 54 is vertically connected to the concave 38a. The lower end of the drain pipe 54 faces downward, and is opened so as to drop the drain into the humidifying water dish 52.

Figure 4:
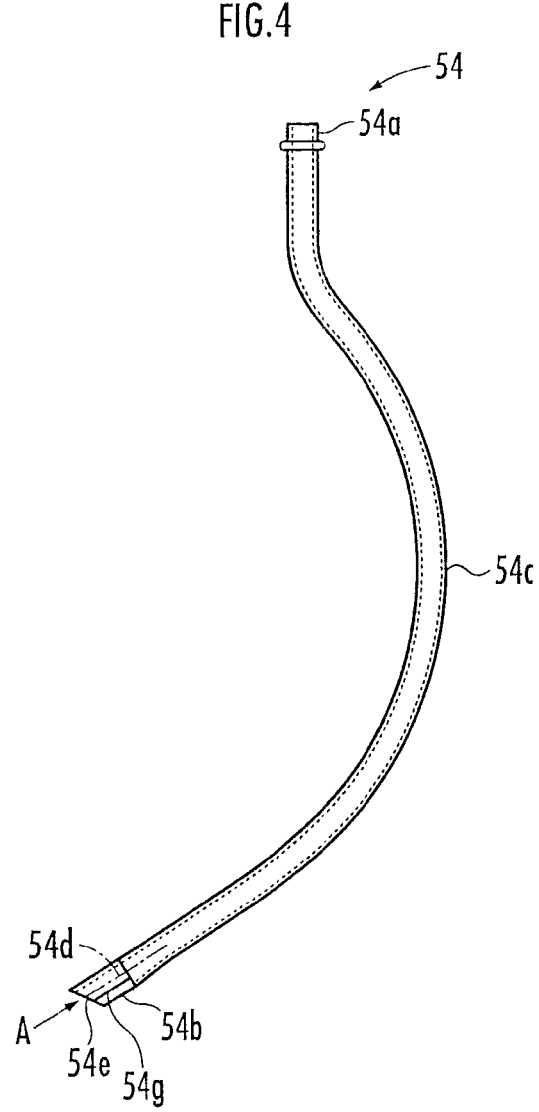
FIG. 4 is a view showing a drain pipe used in the warm air furnace in FIG. 1 through FIG. 3.

As is shown in FIG. 4, the drain pipe 54 is comprised of an upper end portion 54a extending from the upper end for a predetermined distance downward, an arc portion 54c extending from the upper end portion 54a downward in an arcuate shape along the combustion tube 16, and a lower end portion 54b extending along a tangent line of the arc portion 54c for a predetermined distance.

The lower end portion 54b of the drain pipe 54 is formed as a tubular portion with a membrane generated at a plane orthogonal to an axis line 54d by a surface tension of the drain. Therefore, the cross-sectional area of the tubular portion is small enough to suppress leaking of the combustion gas combusted at the combustor into the room, so that it is possible to decrease the leaking of the combustion gas into the room.

The tubular portion constituting the lower end portion 54b of the drain pipe 54 is formed by caulking the side surface thereof in parallel to the axis line 54d, so that it has a caulked line 54g.

Figure 5:
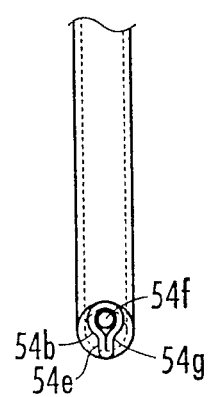
FIG. 5 is a view of the drain pipe seen in a direction of an arrow A in FIG. 4.

On the other hand, the lower end of the tubular portion as is explained above is formed as an opening having an area large enough such that the membrane is not generated by the surface tension of the drain. In the present embodiment, the lower end 54e of the tubular portion is formed in an inclined manner with respect to the axis line 54d of the tubular portion. By doing so, as is shown in FIG. 5, the area of an inclined opening 54f at the lower end 54e of the tubular portion is made larger than the opening area of the plane orthogonal to the axis line 54d of the tubular portion, and becomes large enough such that the membrane is not generated by the surface tension of the drain.

The opening formed at the lower end of the tubular portion is not limited to the case where the lower end thereof is formed in the inclined manner, and may be formed to have an area large enough such that the membrane is not generated from the surface tension of the drain.

In the present embodiment, as is explained above, the lower end portion 54b constituting the drain pipe 54 is formed as a tubular portion with the membrane generated at a plane orthogonal to the axis line 54d by the surface tension of the drain. As such, the opening area of the lower end portion 54b is small enough to suppress leaking of the combustion gas combusted at the gas burner 18 into the room, but the leading end 54e of the tubular portion is formed in the inclined manner with respect to the axis line 54d, and the opening area thereof is Large enough such that the membrane is not generated by the surface tension of the drain. Therefore, the drain flowing into the tubular portion is discharged without generating the membrane from the surface tension. By doing so, it becomes possible to prevent drain from accumulating in the drain pipe 54.

Further, the tubular portion is formed by caulking the side surface of the lower end portion 54b of the drain pipe 54, so that the lower end portion 54b may be formed easily as the tubular portion with the membrane generated at a plane orthogonal to the axis line 54d by the surface tension of the drain.

Figure 6:
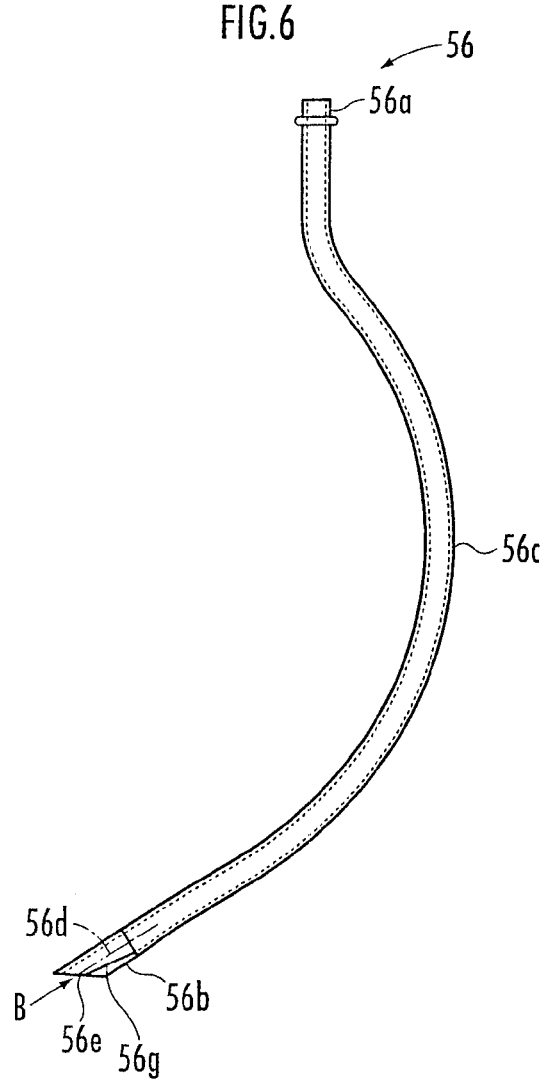
FIG. 6 is a view showing another example of the drain pipe.
Figure 7:
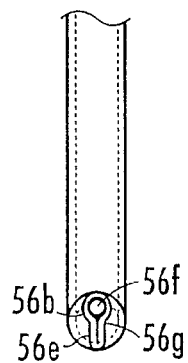
FIG. 7 is a view showing the drain pipe from a direction of an arrow B in FIG. 6.

The lower end portion 54b of the drain pipe 54 of the present embodiment is a straight pipe having uniform inner diameter. However, as is shown in FIG. 6 and FIG. 7, a lower end portion 56b of a similar drain pipe 56 may be formed as a tubular portion in which the inner diameter thereof decreases toward the lower end, by forming the caulking line 56g by caulking the side surface of the lower end portion 56b of the drain pipe 56 so that it becomes angled with respect to the axis line 56d. An opening 56f of a lower end portion 56e is formed so that the area thereof is smaller than the opening 54f in FIG. 5. Therefore, it becomes possible to further suppress leaking of the combustion gas into the room.

What is claimed is:

1. A warm air furnace comprising:
    an air intaker which takes in outdoor air;
    a combustor which is supplied with air taken in by the air intaker together with combustion gas so as to combust the same;
    an exhauster which exhausts combustion gas combusted at the combustor outdoors;
    a thermal exchanger which is provided at the exhauster and which is for transmitting heat of the combustion gas combusted at the combustor to indoor air;
    an air blower which blows indoor air so as to have heat transmitted from the thermal exchanger; and
    a drain discharger which discharges drain formed from condensation of water vapor inside the combustion gas at the exhauster;
    wherein the drain discharger is a conduit with a first end connected to the exhauster and a second end portion opened into the warm air furnace below the exhauster, the second end portion of the drain discharger is formed into a tubular portion with a membrane generated at a plane orthogonal to an axis line of the tubular portion by a surface tension of the drain,
a leading end of the tubular portion is formed as an opening having an area large enough such that the membrane is not generated by the surface tension of the drain, and
the tubular portion is formed by caulking a side surface of the second end portion.

2. The warm air furnace according to claim 1, wherein the leading end of the tubular portion is formed in an inclined manner.

\* \* \* \* \*